(12) United States Patent
Marra et al.

(10) Patent No.: US 11,313,954 B2
(45) Date of Patent: Apr. 26, 2022

(54) OPTOELECTRONIC SENSOR AND METHOD FOR DETECTING THREE-DIMENSIONAL IMAGE DATA

(71) Applicant: SICK AG, Waldkirch (DE)

(72) Inventors: Martin Marra, Waldkirch (DE); Harmut Gimpel, Waldkirch (DE)

(73) Assignee: SICK AG, Waldkirch (DE)

( * ) Notice: Subject to any disclaimer, the term of this patent is extended or adjusted under 35 U.S.C. 154(b) by 252 days.

(21) Appl. No.: 16/433,256

(22) Filed: Jun. 6, 2019

(65) Prior Publication Data
US 2019/0376782 A1 Dec. 12, 2019

(30) Foreign Application Priority Data

Jun. 11, 2018 (DE) .......................... 102018113848.2

(51) Int. Cl.
| | | |
|---|---|---|
| G01B 11/24 | (2006.01) | |
| G01S 7/481 | (2006.01) | |
| G01S 17/42 | (2006.01) | |
| G01S 17/894 | (2020.01) | |

(52) U.S. Cl.
CPC ............ G01S 7/4817 (2013.01); G01B 11/24 (2013.01); G01S 17/42 (2013.01); G01S 17/894 (2020.01)

(58) Field of Classification Search
CPC ............................... G01S 17/894; G01B 11/25
See application file for complete search history.

(56) References Cited

U.S. PATENT DOCUMENTS

| | | | |
|---|---|---|---|
| 10,684,359 B2* | 6/2020 | Axelsson | G01S 7/4816 |
| 2016/0274589 A1 | 9/2016 | Templeton et al. | |
| 2018/0059248 A1* | 3/2018 | O'Keeffe | G01S 17/931 |

FOREIGN PATENT DOCUMENTS

| | | |
|---|---|---|
| DE | 102004014041 A1 | 10/2005 |
| DE | 102015121839 A1 | 6/2017 |
| EP | 2469296 A1 | 6/2012 |
| EP | 2746808 A1 | 6/2014 |

OTHER PUBLICATIONS

Sung Cheol Park, Min Kyu Park and Moon Gi Kang, "Super-resolution image reconstruction: a technical overview," in IEEE Signal Processing Magazine, vol. 20, No. 3, pp. 21-36, May 2003, doi: 10.1109/MSP.2003.1203207.*
German Search Report dated May 10, 2019 corresponding to application No. 102018113848.2.

* cited by examiner

*Primary Examiner* — Rebecca C Bryant
(74) *Attorney, Agent, or Firm* — Nath, Goldberg & Meyer; Jerald L. Meyer

(57) ABSTRACT

An optoelectronic sensor for detecting three-dimensional image data from a monitored zone is provided that has an illumination unit for illuminating the monitored zone with modulated transmitted light, a light receiver for a simultaneous light reception of the transmitted light remitted by objects in the monitored zone at at least two locations at a mutual distance corresponding to a first resolution pattern, and a control and illumination unit that is configured to determine times of flight from properties of the modulated and remitted transmitted light and to detect three-dimensional data in a second resolution pattern finer than the first resolution pattern by at least one measurement repetition with a light reception from at least two other locations shifted with respect to the first resolution pattern.

16 Claims, 4 Drawing Sheets

OPTOELECTRONIC SENSOR AND METHOD FOR DETECTING THREE-DIMENSIONAL IMAGE DATA

FIELD

The invention relates to an optoelectronic sensor for detecting three-dimensional image data from a monitored zone that has an illumination unit for illuminating the monitored zone with modulated transmitted light, a light receiver for a simultaneous light reception of the transmitted light remitted by objects in the monitored zone at at least two locations at a mutual distance corresponding to a first resolution pattern, and a control and illumination unit that is configured to determine times of flight from properties of the modulated and remitted transmitted light and to detect three-dimensional data in a second resolution pattern finer than the first resolution pattern by at least one measurement repetition with a light reception from at least two other locations shifted with respect to the first resolution pattern. The invention further relates to a method for detecting three dimensional image data from a monitored zone in which the monitored zone is illuminated by modulated transmitted light, remitted transmitted light from objects in the monitored zone is received at at least two locations at a mutual distance corresponding to a first resolution pattern, times of flight are determined from properties of the modulated and remitted transmitted light and three-dimensional data are detected in a second resolution pattern finer than the first resolution pattern by at least one measurement repetition with a light reception from at least two other locations shifted with respect to the first resolution pattern.

BACKGROUND

With some optoelectronic sensors which include a laser scanner and a 3D camera, depth information is also detected. Three-dimensional image data are thus produced that are also called a distance image or a depth map. The additional distance dimension can be utilized in a number of applications to obtain 5 more information on objects in the detected scene and thus to satisfy different objects.

Different methods are known for determining the depth information. A scene is illuminated by pulsed light or by amplitude-modulated light in the time of flight (TOF) measurement looked at here. The sensor measures the time of flight of the reflected light at a plurality of locations corresponding to a plurality of measured points. In a pulse process, light pulses are transmitted for this purpose and the duration between the time of transmission and the time of reception is measured. In a phase process, a periodic amplitude modulation and measurement of the phase offset between the transmitted light and the received light takes place.

The time of flight for respective pixels or pixel groups is measured in a 3D camera. In a pulse method, for example, TDCs are connected to the pixels for the time of flight measurement or are even integrated on a wafer together with the pixels. One technology for the acquisition of three-dimensional image data using a phase process is photonic mixing detection (PMD).

In a laser scanner, a light beam generated by a laser periodically sweeps over the monitored zone with the help of a deflection unit. In addition to the measured distance information, a conclusion is drawn on the angular location of the object from the angular position of the deflection unit and image data having distance values in polar coordinates are thus produced after a scanning period. Due to the distance measurement, these image data are called three-dimensional image data even if, strictly speaking, the description would be possible with two coordinates within a plane. Image data from a spatial region are generated by an additional variation or by multi-beam scanning at an elevation angle.

A sensor in accordance with the category provides a certain lateral resolution, with lateral designating the XY plane perpendicular to the Z direction in which distances are measured. This is the pixel resolution of the image sensor with a time of flight camera. Laser scanners have a certain angular resolution that depends on the repetition rate of the individual measurements and on the revolution frequency.

So-called super-resolution methods are known for conventional 2D cameras. Small mechanical movements of the imaging objective or of the image sensor are carried out between two consecutive exposure times here, for example with the aid of a piezo actuator. Images offset from one another by a fraction of the pixel spacing are therefore produced from which then an image is calculated with the aid of image processing methods that has a higher resolution than that corresponding to the original resolution of the image sensor. There is no comparable method for time of flight cameras.

With a laser scanner, the repetition rate of the individual measurements could in principle be increased for a better angular resolution. However, the laser budget as a rule does not permit this, with here both an overload of the element and eye protection issues having to be considered. The possibility then only remains of reducing the revolution frequency, whereby the response time and the measurement value repetition rate deteriorate, however. There are comparable problems in the elevation direction if the scanning takes place by a scan movement here. In a multi-beam system, the number of measurement beams and thus measurement beams could additionally be increased, whereby the system becomes more complex and more expensive, however.

It is furthermore known to measure distances statistically using a plurality of individual measurements. The measurement time can then also be extended if, for instance, a desired measurement value quantity has not yet been reached for instance with dark objects or objects that are far away. However, this is not a procedure for an industrial sensor having a specified response time that is rather directed to the most unfavorable conceivable conditions. In addition, this relates to the distance measurement and not to the lateral resolution.

How such pulse averaging processes can be used for laser scanners is investigated in EP 2 469 296 A1. Since the individual measurements take place at a continued revolution movement, suitable groupings of individual measurements must be found. There is the possibility here of swapping the angular resolution and the distance resolution with one another in that small or large groups are formed. This choice is, however, fixedly made, the laser scanner then in principle no longer behaves differently than a laser scanner using a single pulse process.

A so-called interlace method that works with a small angular offset from revolution to revolution is known for single-beam laser canners that therefore only detect a single central scanning plane. A 1° resolution is thus improved to a 0.25° resolution by four revolutions of 0.25°, 0.5° and 0.75° angular offset. With respect to response times, however, nothing is gained with respect to a system slowed down to ¼ of the revolution frequency with an unchanging repetition of the individual distance measurements increased accordingly relative to the rotational speed.

The rotating mirror of a laser scanner is continuously tilted by guidance in a groove in EP 2 746 808 A1, with the groove forming a sinusoidal pattern that extends over a plurality of revolutions in an embodiment. Other laser scanners achieve corresponding sine curves by a MEMS mirror. As with an interlace process, it takes different amounts of time until the measurement points have reached a desired density. In addition, the intermediate values obtained up to then are confusing and difficult to deal with due to the curvatures of the sine curves.

DE 10 2004 014 041 A1 deals with a sensor system for obstacle recognition in the manner of a laser scanner. In an embodiment, three scanning systems are arranged offset from one another by 120° in the direction of rotation in each case and their elevation angles can be varied by a lift motor. The fields of vision detected by respective scanning systems are thus set such that they together cover a contiguous elevation angular range that is as large as possible. This thus results in a larger monitored spatial zone, but not in a resolution improvement.

SUMMARY

It is therefore the object of the invention to improve the detection of three-dimensional image data.

This object is satisfied by an optoelectronic sensor and by a method of detecting three-dimensional image data from a monitored zone in accordance with the respective independent claim. The monitored zone is illuminated by modulated transmitted light. The transmitted light remitted at objects in the monitored zone is received by a light receiver and indeed from at least two locations simultaneously. These two locations correspond, on the one hand, to two measurement points or measured zones in the monitored zone and, on the other hand, to two detections in the sensor, for example by two photodiodes or by two pixels or pixel areas. The two locations are disposed in a first resolution pattern and an original resolution of the sensor results from their mutual distance. A control and evaluation unit determines times of flight for both locations and thus distances from objects at both measurement points at which the transmitted light was remitted. This measurement is then repeated at least once with a shift with respect to the first resolution pattern. Overall, three-dimensional image data having an improved lateral resolution are acquired therefrom in a second resolution pattern that is finer than the first resolution pattern.

The invention now starts from the basic idea of concentrating the available transmission power on the actual measurement points. Instead of an areal illumination, an illumination unit is used having an illumination concentrated on partial regions of the monitored zone. Only the partial regions corresponding to the locations of the simultaneous light reception are thus illuminated from which the light receiver actually receives light. The partial regions are adapted to the respective locations and are consequently changed with the measurement repetition when the locations are shifted with respect to the first resolution pattern.

The invention has the advantage that a resolution improvement is achieved in the lateral direction. Without restricting general applicability, the convention is here maintained of calling the direction of the distance measurement the Z direction so that the lateral direction is a direction transverse to the Z direction, in particular the XY direction. It is by no means necessary to delay the output of measurement values until all the measurement repetitions are concluded and the measurement data are available in the second resolution pattern. A coarse image of the monitored zone is rather already reduced very fast and then, with a longer observation period, a spatially higher resolution image. The respective weighing between a short measurement time and a high resolution can be made flexibly, for example by parameterization or even differently dynamically or for sub-regions of the monitored zone. An example for mixed demands is a navigation in which fixed objects are to be detected very accurately, but should nevertheless also react to fast moving objects. The hardware demands in accordance with the invention are small in comparison with a sensor having an originally high resolution due to a high number of pixels of the illumination unit and/or light receiver in a time of flight camera or a particularly complex and/or expensive high-power laser transmitter or a large number of scanning planes in a laser scanner. Both the requirement of fast available measurement data and, after a correspondingly longer measurement time for the measurement repetitions, for high resolution measurement data is thus satisfied.

The illumination unit is preferably configured to produce an illumination pattern having an illumination concentrated on the at least two locations in the first resolution pattern. The available transmission power is concentrated on the locations at which measurements are taken using such a directly structured illumination pattern. On the other hand, the structure also does not have to be more exact than the first resolution pattern. The illumination pattern is shifted in the measurement repetitions.

The control and evaluation unit is preferably configured to couple the change of illumination and light reception to one another on a measurement repetition. The locations and thus measurement points are changed equally at the transmission side and at the reception side. Only those areas are very directly illuminated by this coupling in which a measurement is also taken. The illumination and the light reception are preferably very exactly coordinated with one another. Shifts of fractions of pixels of an image sensor or fractions of 1° increments must be taken into account with a laser scanner in this process. Otherwise, on an over-radiation of a location, the available transmission power is not ideally utilized or, with a partial missing of the location, the signal-to-noise ratio would deteriorate because the light receiver is not sufficiently illuminated.

A changeable reception optics is preferably associated with the light receiver and/or the illumination unit preferably has a changeable transmission optics to shift the locations by adapting the optics. Only minimal changes thereby have to be made for the desired change of the locations between the measurement repetitions and the optics can be influenced by relatively simple and/or inexpensive actuators.

The reception optics and/or the transmission optics preferably has/have a liquid lens tiltable by an electric control. This is an exemplary embodiment of a very compact, favorably changeable optics. The principle is similar to a liquid lens having a focus adjustment, but it is not the arching of a boundary layer between two non-miscible media that is changed, but rather its orientation. Such tiltable liquid lenses having a corresponding electrode control are known per se. Other exemplary actuators by which the optics can be changed are piezo actuators, a MEMS mirror, a rotating mirror, or rotating prism, or an acousto-optical modulator.

The light receiver preferably has a matrix arrangement of SPAD light reception elements that can be activated individually or group-wise. SPADs are very sensitive and highly integrable so that a particularly compact sensor can be designed. They can practically be switched to inactive by lowering the preload below the breakdown voltage. This can be used as a kind of electronic diaphragm that effectively darkens any desired sub-regions of the light receiver by being switched to inactive. This electronic diaphragm is one possibility of fixing the locations of the light reception and of adapting them to the measurement repetitions.

The illumination unit preferably has a matrix arrangement of VCSEL transmission elements that can be activated individually or group-wise. Illumination patterns corresponding to the measurement points are thus made possible on the transmission side using a compact and highly integrated module, i.e. a direct selection and adaptation of the partial regions to be illuminated for the locations of the light reception.

The control and evaluation unit is preferably configured to shift the locations on a measurement repetition such that the resolution doubles successively with respect to the first resolution pattern in accordance with an interval halving pattern. In the first step, the resolution pattern is consequently shifted by half the distance between two points and is then so-to-say disposed centrally in the original first resolution pattern. The next two steps then move back or forward by a respective quarter of the distance. Four measurement repetitions are then required for the further doubling at an interval of one eighth in the previous gaps and the distance halving pattern is optionally continued in an analog manner. Alternatively, the locations are further shifted linearly by a respective 1/n of the distance in n measurement repetitions. Shifting is carried out more than once in an interval halving pattern since it does not yet differ from this linear shifting for n=2.

The sensor is preferably configured as a laser scanner and has a rotatable deflection unit for the periodic scanning of the monitored zone. The rotatable deflection unit is a rotating mirror, in particular a polygon mirror wheel, for the periodic beam deflection with a light transmitter and a light receiver arranged as stationary or is alternatively a co-rotating scanning unit having a light transmitter and a light receiver. The meaning of some terms has to be explained in connection with laser scanners. The repeated individual measurements of a laser scanner during a revolution of the scanning unit only form a measurement together, i.e. a measurement repetition corresponds to one revolution. The simultaneous light reception in accordance with the invention means that more than one measurement point is already detected per individual measurement. The laser scanner therefore has a plurality of measurement beams that can be simultaneously active. The first resolution pattern is formed by the spacing of these measurement beams and the angular increments at which individual measurements take place in the course of a revolution.

The laser scanner preferably has a plurality of scanning units in the direction of rotation of the deflection unit with a mutual offset differing from the first resolution pattern. With a laser scanner, it is necessary to distinguish between the resolution in the direction of rotation and in elevation. It is a question of improving the resolution in the direction of rotation in this embodiment. A scanning unit produces a first resolution pattern in the form of angular increments in the course of the revolution and the further scanning units are offset by fractions of the angular increments to refine the first resolution pattern. The angular offset can be achieved mechanically or by time delays in that the further scanning units respectively delay their measurements a little so that the scanning unit has already rotated onward by the desired fraction of an angular increment on their individual measurements. The scanning units can be single-beam units and only detect one central plane in high resolution. The resolution can be even further increased with a multi-beam unit either by arrangement in the center plane or additional planes are added by an arrangement with a portion in elevation.

The scanning units are preferably tiltable or are rotatable about their directions of view. The scanned planes are thereby varied. This is alternatively also achieved by a rotation of the scanning units about their own directions of view, with a rotation changing both the elevation and the alignment in the direction of rotation. With a laser scanner having a rotating mirror or a polygonal mirror wheel as the deflection unit, the deflection unit itself can alternatively be tilted. With a polygon mirror wheel, the facets can in another respect already be tilted with respect to one another, but the resolution thereby produced is still the first resolution pattern since a measurement repetition corresponds to one complete revolution.

The control and evaluation unit is preferably configured to adapt the changes of the locations to the objects. The measurement and output behavior of the sensor is thus dynamically adapted to the scene. Whether objects move fast or slowly can be recognized from previous measurements. A slow object should then be measured rather with a good resolution; a fast object with a brief measurement time. Accordingly with slow objects, the locations are frequently varied and measurement values are output less often; conversely with fast objects, the locations are varied less or not at all and in return current measurement values are present after a few measurement repetitions or even after every measurement repetition. A balance thus becomes possible between high lateral spatial resolution and a short measurement time that can be changed fast depending on the currently available measurement data.

The control and evaluation unit is preferably configured to carry out the changes of the locations to the objects locally differently. This primarily relates to the difference between fast and slow objects. The adaptations named in the previous paragraph are carried out locally in this embodiment, or even locally and dynamically. There are consequently part portions of the scene or of the monitored zone having a large number of changes of the locations and a high resolution and conversely there are part portions having few or no changes and a lower resolution. The weighing named multiple times between high lateral spatial resolution and a short measurement time is thus carried out separately for different regions.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
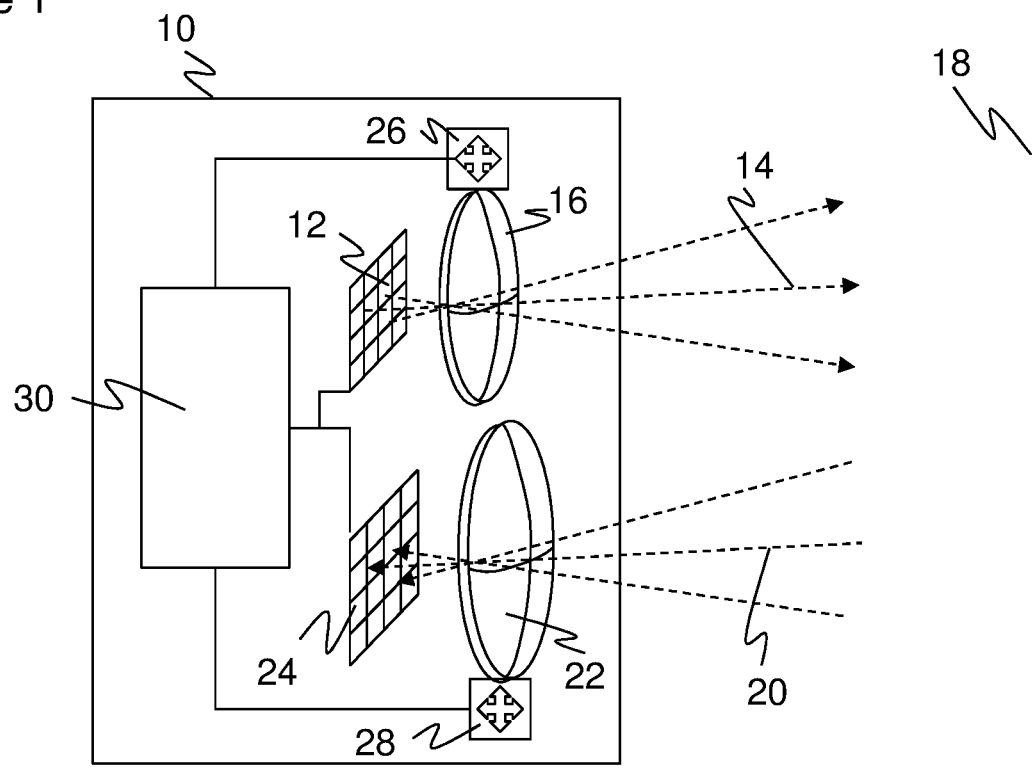
FIG. 1 a schematic representation of an embodiment of a sensor as a time of flight camera.

FIG. 1 shows a schematic representation of a sensor 10 in an embodiment as a time of flight camera. Modulated transmission light 14 is produced by a light transmitter 12 and a monitored zone 18 is thus illuminated by a transmission optics 16. The light transmitter 12 is able to produce a structured illumination pattern with light in specific partial regions of the monitored zone 18. The available light power can thus be concentrated on the actual measured points, which substantially improves the signal-to-noise ratio in contrast with a simple areal illumination. A VCSEL array is used as the light transmitter 12 here whose VCSELs are activated individually or group-wise in accordance with the desired illumination pattern. Other examples of a suitable light transmitter are a multiple arrangement of other light sources such as LEDs or edge emitter laser diodes, or an optical phased array.

If transmitted light 14 is incident on objects in the monitored zone 18, a portion is reflected back to the sensor 10 as remitted transmitted light 20. The remitted transmitted light 20 moves through a reception optics 22 to a light receiver 24 that is configured as a SPAD array here. SPADs are highly sensitive and highly integrable and they offer the option of becoming practically inactive by lowering the preload below the breakdown voltage. Only those SPADs can thereby respectively be switched to active that correspond to desired measurement points. Alternatively to a SPAD array, a multiple arrangement of photodiodes or APDs or another matrix receiver, for example in CCD or CMOS technology, is conceivable in which then optionally only specific pixels or pixel groups are read corresponding to desired measurement points.

The transmission optics 16 and the reception optics 22 are each only represented by a simple lens that is representative for any desired optics having multi-lens objectives, diaphragms, and other optical elements. A reflective or diffractive optics is also conceivable. An optics adjustment 26 at the transmission side and an optics adjustment 28 at the reception side, for example by a piezo actuator system, provides the possibility of moving the optics 16, 22. The movement takes place laterally in the XY direction perpendicular to the Z direction in which the sensor 10 measures distance and the direction of transmission and reception respectively is changed by this movement. A movement in the Z direction for a focus adjustment is, however, also possible.

The change of the direction of transmission and reception by optics adjustments 26, 28 is only an embodiment. First, alternatively, the light transmitters 12 and the light receivers 24 or the whole sensor 10 can be moved. Further possibilities are optical elements such as a MEMS mirror, a rotating mirror, a rotating prism, or an acousto-optical modulator. A preferred embodiment uses a liquid lens in which the boundary layer between two non-miscible media can be tilted by control of an electrode arrangement. In the embodiment shown having a VCSEL array and a SPAD array, an optics adjustment 26, 28 or also a replacement therefore can be fully omitted in that the movement is emulated by a direct activation of specific VCSELs or SPADs.

A control and evaluation unit 30 is connected to a light transmitter 12, a light receiver 24, and the optics adjustments 26, 28. The transmitted light 14 is thus modulated, for instance for pulses for a single-pulse process or for a pulse averaging process or for a periodic amplitude modulation for a phase method, and the distance from measurement points in the monitored zone is determined from the received signal of the light receiver 24 using a time of flight process. Such time of flight processes are known per se, for instance by means of TDCs for a pulse method or PMDs for a phase method. At least parts of the control and evaluation unit 30 can be integrated with the light transmitter 12 or with the light receiver 24 on a common module; for instance a signal production for the modulation of the transmitted light 14 or TDCs for the evaluation of the reception signal.

Figure 2A:
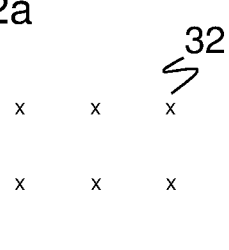
FIGS. 2a-d an exemplary representation in different measurement repetitions of measurement points shifted with respect to a first resolution pattern.

FIG. 2a shows exemplary measurement points 32 of the sensor 10 in which a respective distance is determined by means of time of flight processes. The view is a front view, that is the measurement points 32 form a lateral arrangement. Spacings or gaps at which no measurement value is determined are disposed between the measurement points 32. The spacings can correspond to the natural resolution, i.e. to the pixel pitch, or only pixels are activated or read artificially between which there is at least one inactive pixel.

The spacings for the measurement points 32 are detected simultaneously in a measurement. The measurement is subsequently repeated at least once after a shift of the measurement points 32 by means of the optics adjustments 26, 28. FIGS. 2a-d show a total of four such measurement repetitions without a shift, with a shift in the X direction, with a shift in the Y direction, and with a shift both in the X direction and in the Y direction, as respectively indicated by arrows.

The measurement points form a first resolution pattern 34 within a measurement repetition. The shift between the measurement repetitions is smaller than the distance between two points of the resolution pattern 34. A shift by more than this distance is possible here, but not significant; the observation is made, so-to-say, modulo distance in the resolution pattern 34. Measurement points 32 in the gaps of the original first resolution pattern 34 are detected with the measurement repetitions by this small shift. After the measurement repetitions, measurement values are present in a second resolution pattern whose distance is produced by the shifts and that is finer than the first resolution pattern.

Figure 2B:
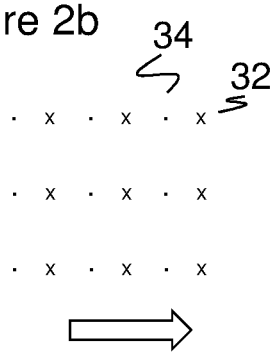
Figure 2C:
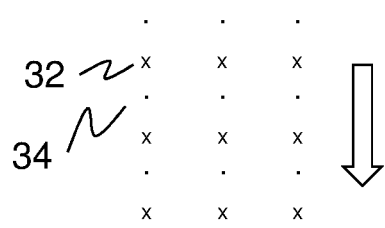
Figure 2D:
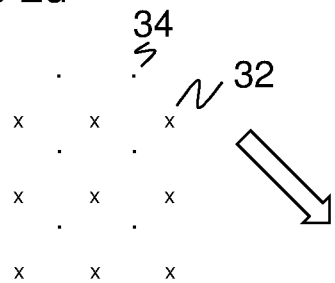

In the example shown, the X resolution is doubled by the measurement repetition in accordance with FIG. 2b; the Y resolution by the measurement repetition in accordance with FIG. 2c; and the gaps in the X direction of the line supplemented by FIG. 2c are filled by the measurement repetition in accordance with FIG. 2d. The resolution is thus doubled overall. This is only one of a number of examples how the shifts can produce the most varied resolution improvements. Measurement points 32 in the first resolution pattern 34 are already present after the first measurement repetition. There is therefore the possibility of selectively choosing the fast provision of measurement values after only one measurement repetition or a faster measurement after a plurality of measurement repetitions.

Figure 3:
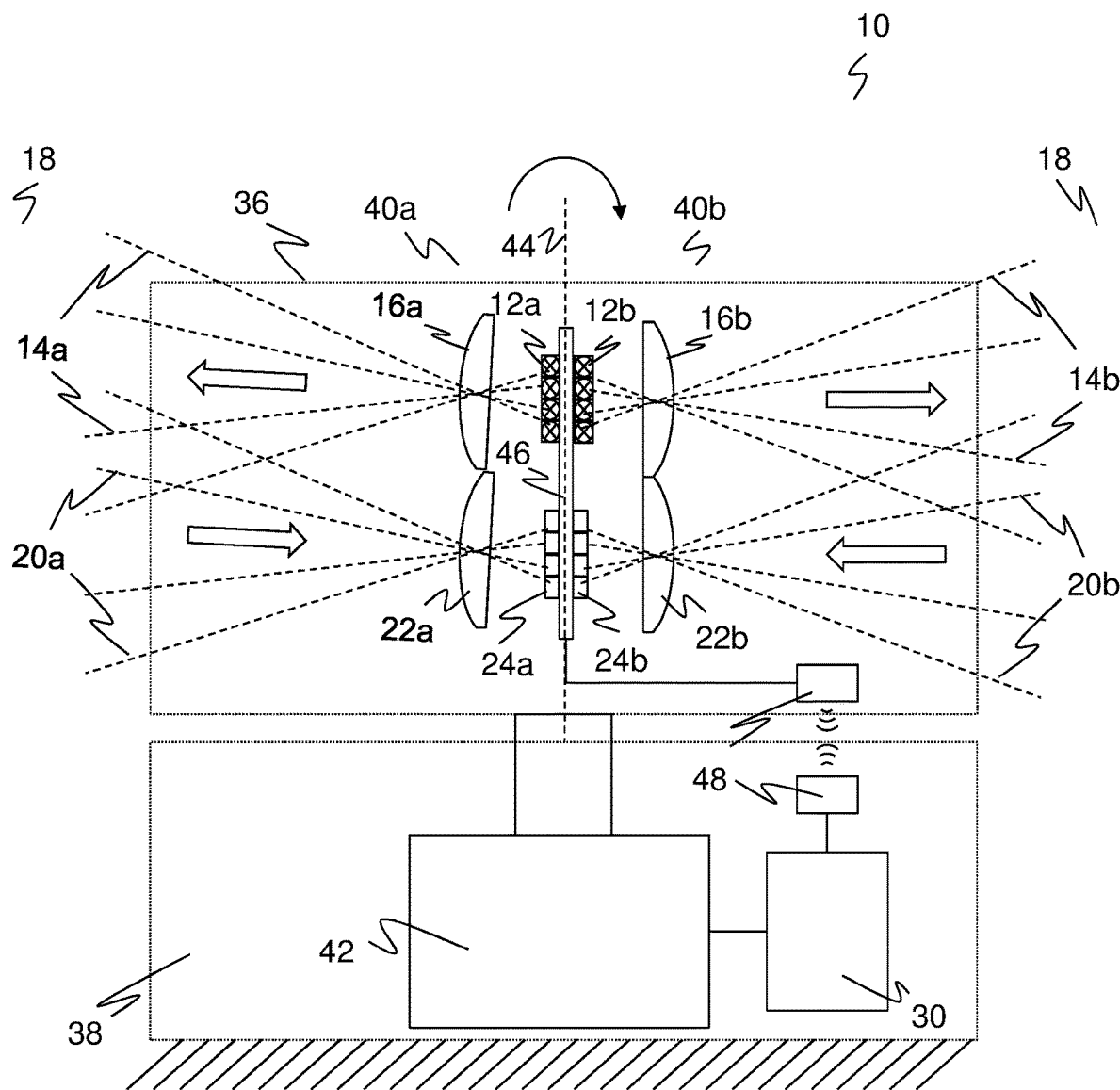
FIG. 3 a schematic representation of an embodiment of a sensor as a laser scanner.

FIG. 3 shows a schematic sectional representation through a further embodiment of the sensor 10 as a laser scanner, here in particular as a multi-beam laser scanner. The sensor 10 in a rough distribution comprises a movable deflection unit 36 and a base unit 38. The deflection unit 36 forms the actual optical measurement head, whereas further elements such as a supply, evaluation electronics, terminals and the like are accommodated in the base unit 38. In operation, the deflection unit 36 is set into a rotational movement about an axis of rotation 44 with the aid of a drive 42 of the base unit 38 to thus periodically scan the monitored zone 18.

The deflection unit 36 in this embodiment has two scanning units 40a-b, each having a light transmitter 12a-b, a transmission optics 16a-b, a light receiver 24a-b, and a reception optics 22a-b. Corresponding line arrangements, but also the already named multiple arrangements having only some light sources and light reception elements can preferably be considered as light transmitters 12a-b and light receivers 24a-b in addition to a VCSEL array and a SPAD array in a laser scanner. Optics adjustments 26, 28 are not provided here, but are possible in different embodiments. Instead, the scanning units 40a-b are tilted in elevation with respect to one another so that the direction of transmission and reception of the transmitted light 14a and the remitted transmitted light 20a is at an angle with respect to the transmitted light 14b and the remitted transmitted light 20b of the other scanning unit 40b. In another respect, the two scanning units 40a-b can also not be of the same design, as shown, and can in particular have different beam numbers.

The light transmitter 12a-b and the light receiver 24a-b are arranged together in this embodiment on a circuit board 46 that is disposed on the axis of rotation 44 and that is connected to the shaft of the drive 42. This is only to be understood by way of example; practically any desired numbers and arrangements of circuit boards are conceivable. The basic optical design with light transmitters 12a-b and light receivers 24a-b biaxially disposed next to one another is also not compulsory and can be replaced with any construction design known per se from single-beam optoelectronic sensors or laser scanners. An example for this is a coaxial arrangement with or without beam splitters.

A contactless supply interface and data interface 48 connects the moving deflection unit 36 to the stationary base unit 38. The control and evaluation unit 30 is located there that can at least partly also be accommodated on the circuit board 46 or at another site in the deflection unit 36. The control and evaluation unit 30 measures distances, in principle as already with respect to FIG. 1, using a time of flight process. It additionally controls the drive 42 and receives the signal of an angular measurement unit which is not shown, which is generally known from laser scanners, and which determines the respective angular position of the deflection unit 36. Two-dimensional polar coordinates of all the measurement points in a scanning plane are thus available after very revolution with angle and distance. More precisely, a plane is actually only scanned at one elevation angle of V, that is at a horizontal transmitted light beam not present in FIG. 3. As shown, with scanning beams that in contrast have an elevation angle, the jacket surface of a cone is scanned that is formed as differently sharp depending on the elevation angle. A type of nesting of a plurality of hourglasses is produced overall. These areas are here also sometimes called scanning planes in simplified terms.

The sensor 10 shown is a laser scanner having a rotating measurement head, namely the deflection unit 36. Alternatively, a periodic deflection by means of a rotating mirror or by means of a polygon or facet mirror wheel is also conceivable. The scan movement for producing the scan plane can furthermore instead also be produced using different known methods, for example MEMS mirrors, optical phase arrays, or acousto-optical modulators.

It is not the individual measurement of a distance that is understood as a measurement with a laser scanner, but rather the totality of the individual measurements during a revolution. The first resolution pattern is, on the one hand, formed by the repetition rate of the individual measurements and thus the angular resolution in the direction of rotation and, on the other hand, by the distance between the plurality of beams that already simultaneously detect a plurality of measurement points in a single measurement. A measurement repetition takes place by a further revolution. In embodiments as in FIG. 3 with a plurality of scanning units 40a-b, the second measurement by the other, tilted scanning unit 40b-a can also be understood as the measurement repetition.

Figure 4:
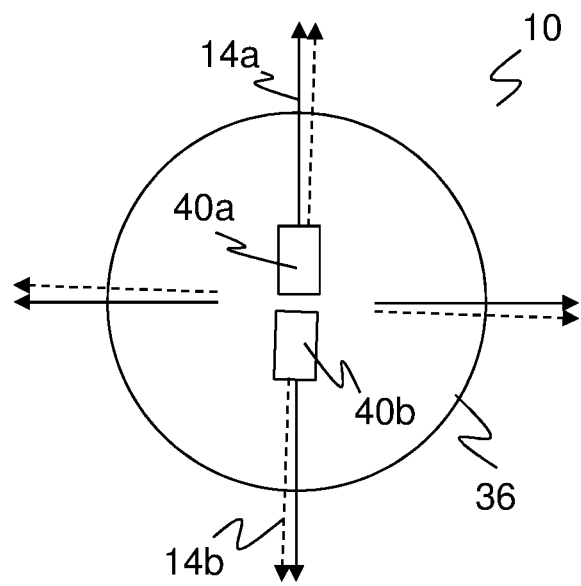
FIG. 4 a plan view of two rotating scanning units having a mutual angular offset shifted with respect to a first resolution pattern.

FIG. 4 shows a plan view of the rotating deflection unit 36 having two scanning units 40a-b to explain the resolution increase by offset from a first resolution pattern in more detail in connection with laser scanners. FIG. 4 relates to a resolution increase in the direction of rotation while later, with reference to FIG. 5, an alternative or additional resolution increase in elevation is discussed.

In the embodiment in accordance with FIG. 4, the resolution increase is effected in that the second scanning unit 40b is tilted in the direction of rotation with respect to the first scanning unit 40a. Only the portion of the tilt that does not correspond to any multiple of the angular spacing is important here. If, for example, the angular increments of the first resolution pattern amount to 1°, that is an individual measurement takes place once every 1°, an offset between the two scanning units 40a-b could be at 0.5°. In fact, the offset in accordance with the representation in FIG. 4 is sensibly at 180.5°, but the portion of 180° in the angular pattern does not make any contribution except for a minimal time offset.

The tilt can be physical, as shown. It is, however, also possible to delay the individual measurement of a scanning unit 40b by less than the period of an individual measurement. This has the same effect since the deflection unit 36 continues to rotate by a corresponding fraction of the angular spacing during the delay. A further possibility of increasing the resolution in the direction of rotation comprises a scanning unit 40a-b being used having at least two beams that are disposed horizontally next to one another. The angular offset in the direction of rotation is thus already provided within the scanning unit 40a-b.

The light transmitter 12 is preferably omitted between two individual measurements to reduce its heating. The light transmitter 12 can therefore have a greater current applied within the used measurement points in time or can be switched on more frequently without reducing its service life.

The spatially offset measurement ranges 34 can optionally also partly overlap the measurement ranges 32 or the measurement ranges 34 from a differently shifted pattern.

Figure 5:
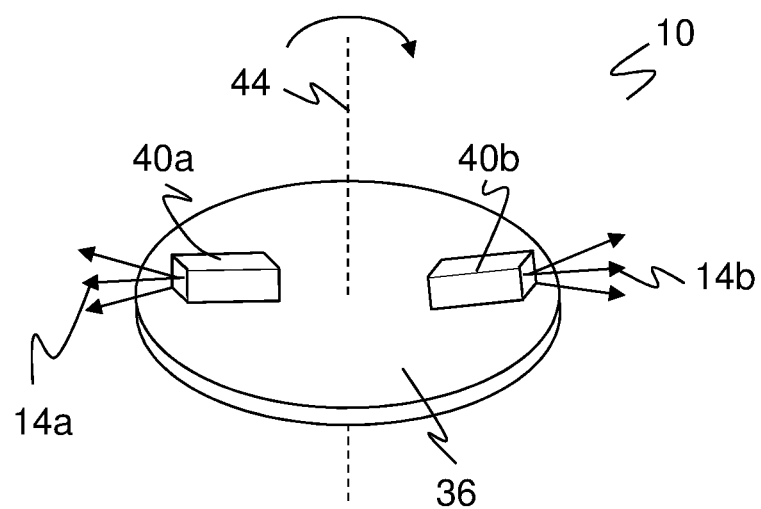
FIG. 5 a three-dimensional view of two rotating scanning units having a mutual angular offset in elevation.

FIG. 5 shows a three-dimensional view of the rotating deflection unit 36 of a further embodiment of a laser scanner now with a resolution increase in elevation or in the plane angle. The two scanning units 40a-b each produce three scanning beams 14a-b. They are mutually tilted in elevation, the respective three scanning planes are so-to-say interlaced and thus fill mutual gaps. Apart from the anyway exemplary number of scanning beams 14a-b, this corresponds to the representation in accordance with FIG. 3. In another respect, the number of two scanning units 40a-b is naturally also only exemplary in each case.

The orientation of the scanning units 40a-b is preferably not rigid, but rather variable. The two scanning units 40a-b of FIG. 5 can thus also not be understood as two physical units, but rather as two instantaneous recordings of only one single scanning unit at different points in time. Adjustments, not shown, are provided to influence the orientation of a scanning unit 40a-b. In particular the variants explained with respect to FIG. 1 are conceivable here. For example, a change is effected by moving the optics 16a-b, 22a-b, moving the light transmitters 12a-b or light receivers 24a-b, moving the scanning units 40a-b themselves, moving a rotational mirror or a polygon mirror wheel, in particular by means of piezo actuator systems in each case, by activating specific VSCELs or SPADs or by wavelength detuning of an optical phased array.

Figure 6A:
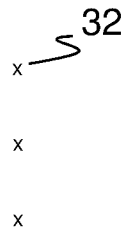
FIGS. 6a-c an exemplary representation in different repetitions by tilting scanning units of shifted measurement points.
Figure 6B:
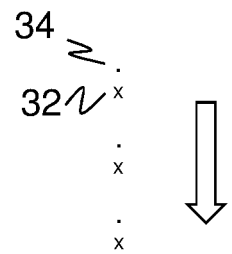
Figure 6C:
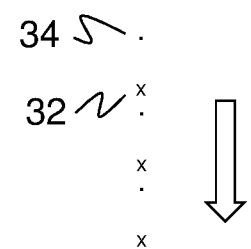

FIGS. 6a-c show measurement points 32 during an individual measurement. In a very similar manner as in FIGS. 2a-d, the measurement points 32 are shifted from the original first resolution pattern 34 by the tilting of the scanning unit 40a-b for measurement repetitions in accordance with FIGS. 6b-6c. In this embodiment, it is not a matrix arrangement as in FIGS. 2a-d, but rather only a linear arrangement. For this purpose, again only as an example, the measurement points 32 are shifted twice by a respective third of the distance of the first resolution pattern 34. Three scanning planes are thus detected successively three times in three revolutions and the resolution is thus effectively tripled in elevation. Two-dimensional arrangements of measurement points 32 are also possible with a laser scanner; a mixture of more densely disposed scanning planes in elevation and a higher resolution in the direction of rotation is then produced.

Figure 7A:
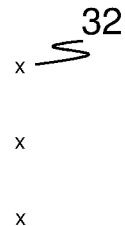
FIGS. 7a-c an exemplary representation in different repetitions by rotating scanning units of shifted measurement points.
Figure 7B:
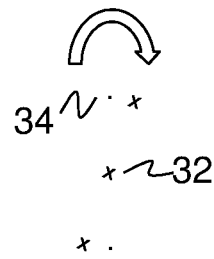
Figure 7C:
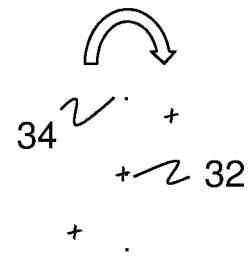

FIGS. 7a-c illustrate measurement points 32 similar to FIGS. 6a-c, only with here the scanning unit 40a-b not being tilted, but rather being rotated about its own direction of view. The scanning planes are guided more densely to one another by the rotation; in addition, an offset of the measurement points 32 in the direction of rotation is produced. Again, a 2D arrangement of the measurement points 32 can also be provided instead of a linear arrangement. A scanning unit 40a-b can also both be tilted and rotated; the effects are then summed.

Figure 8:
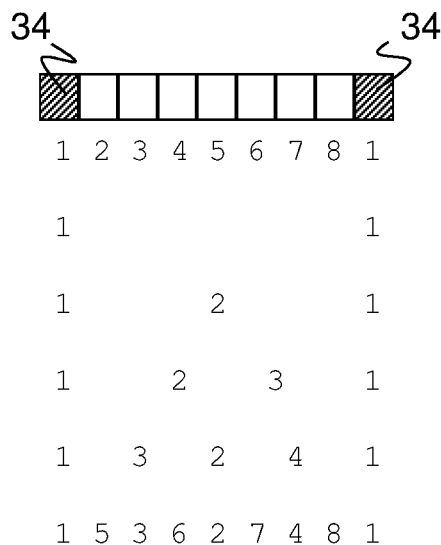
FIG. 8 a representation of different detection schemes having measurement points shifted with respect to a first resolution pattern.

FIG. 8 illustrates some examples of how the measurement points 32 can each be advantageously shifted between the measurement repetitions. The topmost line here only shows a notional resolution pattern in which the dark fields stand for the original first resolution pattern. The notional resolution pattern comprises eight measurement repetitions, with naturally also more or fewer measurement repetitions being conceivable. The further lines respectively symbolize a conceivable embodiment, with a numeral indicating the measurement repetition in which a shift corresponding to the numeral takes place.

The gap in the first resolution pattern 34 is evenly divided in the sequence "123456781". A sequence "1 1" is only shown for reasons of comparison; it corresponds to a conventional scan without a measurement repetition with shifted measurement points 32. The following two lines show a uniform division like the first line, but with two or three measurement repetitions instead of eight.

The two bottommost lines illustrate preferred interval halvings. In the penultimate line, the second measurement repetition halves the distance, the third and fourth measurement repetitions set the measurement points 32 centrally in the existing gaps and halve the distance again to a quarter in total. In the bottommost line, the procedure is continued with the next four measurement repetitions to achieve a further halving of the distance. Measurement values are also available in a higher resolution due to an interval halving and are then successively further doubled.

It is common to the embodiments that after which measurement repetitions and thus after which measurement time a measurement value having a specific lateral spatial resolution is available is clear in advance. A weighing between the measurement time and the lateral spatial resolutions can therefore be made. In the sense of FIG. 8, as an example, a high time resolution is given by a sequence "1 1 1 1 1 1 1 1 . . . " and a high lateral spatial resolution by a sequence "1 5 3 6 2 7 4 8 1 . . . ". The configuration takes place on the basis of the idea that a high lateral spatial resolution is desirable for slowly moved objects, whereas this high resolution is no longer as important for fast moved objects as a fast provision of a measurement value also with a coarser spatial resolution.

With a laser scanner, a resolution improvement in the direction of rotation in accordance with FIG. 4 can also be combined with a resolution improvement in elevation in accordance with FIG. 6 or 7.

The conventionally rigid coupling, that is the same for all measurement ranges, between the measurement time and the lateral spatial resolution can be dissolved in accordance with the invention by configuring a scanning and movement scheme. This is possible by parameterization in the field that is then maintained for a certain operation time.

It is, however, also possible to carry out the weighing dynamically based on already present measurement values. If it was, for example, recognized that an object has not moved at all or only a little, lateral spatial resolution can be improved and the object can be measured more exactly with a longer measurement time with more measurement repetitions.

A dynamic or fixed adaptation is also locally adaptable. Measurement therefore takes place roughly and fast for certain partial regions of the monitored zone 18 fixed initially or in the course of operation and exactly and fast for other partial regions. This can be combined with a dynamic adaptation to actually detected objects.

Adaptations in each case mean that the shift is changed in degree and direction, in particular laterally in the X direction, Y direction, or by a tilt or a rotation, and/or that the sequence is changed as explained in some variants with respect to FIG. 8.

The invention claimed is:

1. An optoelectronic sensor for detecting three-dimensional image data from a monitored zone, the optoelectronic sensor comprising:
   an illumination unit for illuminating the monitored zone with modulated transmitted light;
   a light receiver for a simultaneous light reception of the transmitted light remitted by objects in the monitored zone at at least two locations corresponding to a first resolution pattern; and
   a control and illumination unit that determines times of flight from properties of the modulated and remitted transmitted light in a measurement and that detects three-dimensional data by at least one measurement repetition obtained by light reception from at least two other locations shifted with respect to the first resolution pattern by repeating the measurement at least once with a shift with respect to the first resolution pattern,
wherein the shift causes measurement points to be detected in gaps of the original first resolution pattern, the measurement points within each measurement repetition performed at a distance corresponding to the first resolution pattern, and the shift being smaller than the distance between two points of the first resolution pattern, such that, after the at least one measurement repetition, three-dimensional image data with an improved lateral resolution are provided in a second resolution pattern whose distance measurement results from the shift and which is finer than the first resolution pattern,
and wherein the illumination unit is concentrated on partial regions of the monitored zone; and with the control and evaluation unit adapting the illumination unit to the respective locations.

2. The optoelectronic sensor in accordance with claim 1, wherein the illumination unit produces an illumination pattern with illumination concentrated on the at least two locations in the first resolution pattern.

3. The optoelectronic sensor in accordance with claim 1, wherein the control and evaluation unit couples a change of illumination and light reception to one another obtained from the measurement repetition.

4. The optoelectronic sensor in accordance with claim 1, wherein a changeable reception optics is associated with the light receiver.

5. The optoelectronic sensor in accordance with claim 1, wherein the illumination unit has a changeable transmission optics to shift the locations by adapting the optics.

6. The optoelectronic sensor in accordance with claim 4, wherein at least one of the reception optics and the transmission optics has a liquid lens tiltable by electric control.

7. The optoelectronic sensor in accordance with claim 5, wherein at least one of the reception optics and the transmission optics has a liquid lens tiltable by electric control.

8. The optoelectronic sensor in accordance with claim 1, wherein the light receiver has a matrix arrangement of SPAD light reception elements that can be activated individually or group-wise.

9. The optoelectronic sensor in accordance with claim 1, wherein the illumination unit has a matrix arrangement of VCSEL transmission elements that can be activated individually or group-wise.

10. The optoelectronic sensor in accordance with claim 1, wherein the control and evaluation unit shifts the locations on a measurement repetition such that the resolution doubles successively with respect to the first resolution pattern in accordance with an interval halving pattern.

11. The optoelectronic sensor in accordance with claim 1, the illumination unit and light receiver configured as a laser scanner using a rotatable deflection unit for the periodic scanning of the monitored zone.

12. The optoelectronic sensor in accordance with claim 11, that has a plurality of scanning units having a mutual offset differing from the first resolution pattern in the direction of rotation of the deflection unit.

13. The optoelectronic sensor in accordance with claim 11, wherein the scanning units are tiltable or are rotatable about their direction of view.

14. The optoelectronic sensor in accordance with claim 1, wherein the control and evaluation unit adapts the changes of the locations to the objects.

15. The optoelectronic sensor in accordance with claim 1, wherein the control and evaluation unit carries out the changes of the locations locally differently.

16. A method for detecting three-dimensional image data from a monitored zone in which:
illuminating the monitored zone by modulated transmitted light,
receiving, remitted transmitted light from objects in the monitored zone at at least two locations corresponding to a first resolution pattern,
determining times of flight from properties of the modulated and remitted transmitted light,
repeating the measurement at least once with a shift with respect to the first resolution pattern,
detecting three-dimensional data by at least one measurement repetition using a light reception from at least two other locations shifted with respect to the first resolution pattern obtained by said repeating the measurement at least once with a shift with respect to the first resolution pattern,
detecting the shift causes measurement points in gaps of the original first resolution pattern, and performing the measurement points within each measurement repetition at a distance corresponding to the first resolution pattern, and the shift being smaller than the distance between two points of the first resolution pattern, such that, after the at least one measurement repetition, and providing three-dimensional image data with an improved lateral resolution in a second resolution pattern whose distance measurement results from the shift and which is finer than the first resolution pattern, and
concentrating the illumination with modulated transmitted light on partial regions of the monitored zone and is adapted to the respective locations.

* * * * *